(12) United States Patent  
Yu et al.

(10) Patent No.: US 8,891,869 B2  
(45) Date of Patent: Nov. 18, 2014

(54) SYSTEM AND METHOD FOR EFFECTIVELY PERFORMING AN INTEGRATED SEGMENTATION PROCEDURE

(75) Inventors: Liangyin Yu, Fremont, CA (US); Ming-Chang Liu, San Jose, CA (US)

(73) Assignee: Sony Corporation, Tokyo (JP)

( * ) Notice: Subject to any disclaimer, the term of this patent is extended or adjusted under 35 U.S.C. 154(b) by 563 days.

(21) Appl. No.: 13/065,852

(22) Filed: Mar. 31, 2011

(65) Prior Publication Data

US 2012/0251000 A1 Oct. 4, 2012

(51) Int. Cl.
  G06K 9/34 (2006.01)
  G06T 7/40 (2006.01)
  G06T 7/00 (2006.01)

(52) U.S. Cl.
  CPC .............. *G06T 7/0081* (2013.01); *G06T 7/408* (2013.01); *G06T 7/0087* (2013.01)
  USPC ........................................... 382/173

(58) Field of Classification Search
  USPC .......... 382/164, 173, 195, 199, 224, 274, 286
  See application file for complete search history.

(56) References Cited

U.S. PATENT DOCUMENTS

| 6,301,440 | B1* | 10/2001 | Bolle et al. ............. 396/128 |
| 2008/0253622 | A1* | 10/2008 | Tosa et al. .............. 382/117 |
| 2009/0324049 | A1* | 12/2009 | Kontos et al. ........... 382/132 |
| 2010/0074523 | A1 | 3/2010 | Ishiga |
| 2010/0310159 | A1* | 12/2010 | Ranganathan ........... 382/161 |
| 2011/0115786 | A1* | 5/2011 | Mochizuki ............... 345/419 |

OTHER PUBLICATIONS

Sharon, E., Brandt, A., Basri, R., Segmentation and Boundary Detection Using Multiscale Intensity Measurements, Computer Vision and Pattern Recognition, 2001, Dept. of Comput. Sci. & Applied Math., Weizmann Inst. of Sci., Rehovot, Israel, http://ieeexplore.ieee.org/spl/freeabs_all.jsp?arnumber=990512, p. 1.

* cited by examiner

*Primary Examiner* — Phuoc Tran  
(74) *Attorney, Agent, or Firm* — Gregory J. Koerner; Redwood Patent Law

(57) ABSTRACT

A system and method for effectively performing an integrated segmentation procedure comprises an image segmenter that includes a texture modeler, a contrast modeler, and a model integrator. The texture modeler creates a texture model based upon an original image. Similarly, the contrast modeler creates a contrast model based upon the original image. The model integrator then performs a model integration procedure to create a final segmented image by integrating the texture model and the contrast model according to a calculated texture model metric. A processor of an electronic device typically controls the image segmenter to perform the integrated segmentation procedure.

20 Claims, 7 Drawing Sheets

SYSTEM AND METHOD FOR EFFECTIVELY PERFORMING AN INTEGRATED SEGMENTATION PROCEDURE

BACKGROUND SECTION

1. Field of the Invention

This invention relates generally to techniques for managing image information, and relates more particularly to a system and method for effectively performing an integrated segmentation procedure.

2. Description of the Background Art

Implementing effective methods for managing image information is a significant consideration for designers and manufacturers of electronic systems. However, effectively implementing these electronic systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic system that effectively supports image identification procedures may benefit from an efficient implementation because of the large amount and complexity of the digital data involved.

Due to growing demands on system resources and substantially increasing data magnitudes, it is apparent that developing new techniques for managing image information is a matter of concern for related electronic technologies. Therefore, for all the foregoing reasons, developing effective systems for managing image information remains a significant consideration for designers, manufacturers, and users of contemporary electronic systems.

SUMMARY

In accordance with the present invention, a system and method are disclosed for effectively performing an integrated segmentation procedure. In accordance with one embodiment of the present invention, an image segmenter of an electronic device performs an integrated segmentation procedure by utilizing multiple segmented models that include, but are not limited to, a texture model and a contrast model. The image segmenter may then integrate the multiple models to produce a final segmented image. During the model integration procedure, high textured regions may be segmented by utilizing the texture model, while more homogeneous regions may be segmented by utilizing the contrast model. In addition, in certain embodiments, the image segmenter may perform a region integration procedure to integrate various individual regions that comply with predefined region integration criteria.

In one embodiment, a texture modeler of the image segmenter performs a texture segmentation procedure to create a texture model based upon an original image to represent different regions with varying degrees of texture characteristics. Similarly, a contrast modeler of the image segmenter performs a contrast segmentation procedure to create a contrast model based upon the original image to represent different regions with varying degrees of contrast characteristics.

In certain embodiments, the image segmenter may derive a texture model metric to describe which areas of the image have texture characteristics that are greater than a predefined texture threshold level. A model integrator of the image segmenter may then perform a model integration procedure to produce the final segmented image by utilizing any appropriate techniques. For example, in certain embodiments, the model integrator utilizes segments from the texture model to segment sections of the image with texture characteristics that are greater than the pre-defined texture threshold level. Conversely, the model integrator utilizes segments from the contrast model to segment sections of the image with texture characteristics that are less than the pre-defined texture threshold level.

In certain embodiments, a region integrator of the image segmenter may optionally perform region integration procedures to incorporate various regions that comply with predefined region integration criteria into other segmented regions. The present invention thus provides a robust image segmentation technique in which an adaptive texture model and a homogeneous contrast model are developed and integrated to address the problem of segmenting images in complicated real world scenarios. Integration of several models provides accurate segmentation for various applications such as image understanding and scene classification. For all of the foregoing reasons, the present invention therefore provides an improved system and method for effectively performing an integrated segmentation procedure.

DETAILED DESCRIPTION

The present invention relates to an improvement in image identification systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively performing an integrated segmentation procedure, and may comprise an image segmenter that includes a texture modeler, a contrast modeler, and a model integrator. The texture modeler creates a texture model based upon an original image. Similarly, the contrast modeler creates a contrast model based upon the original image. The model integrator then performs a model integration procedure to create a final segmented image by integrating the texture model and the contrast model according to a calculated texture model metric. A processor of an electronic device typically controls the image segmenter to perform the integrated segmentation procedure.

Figure 1:
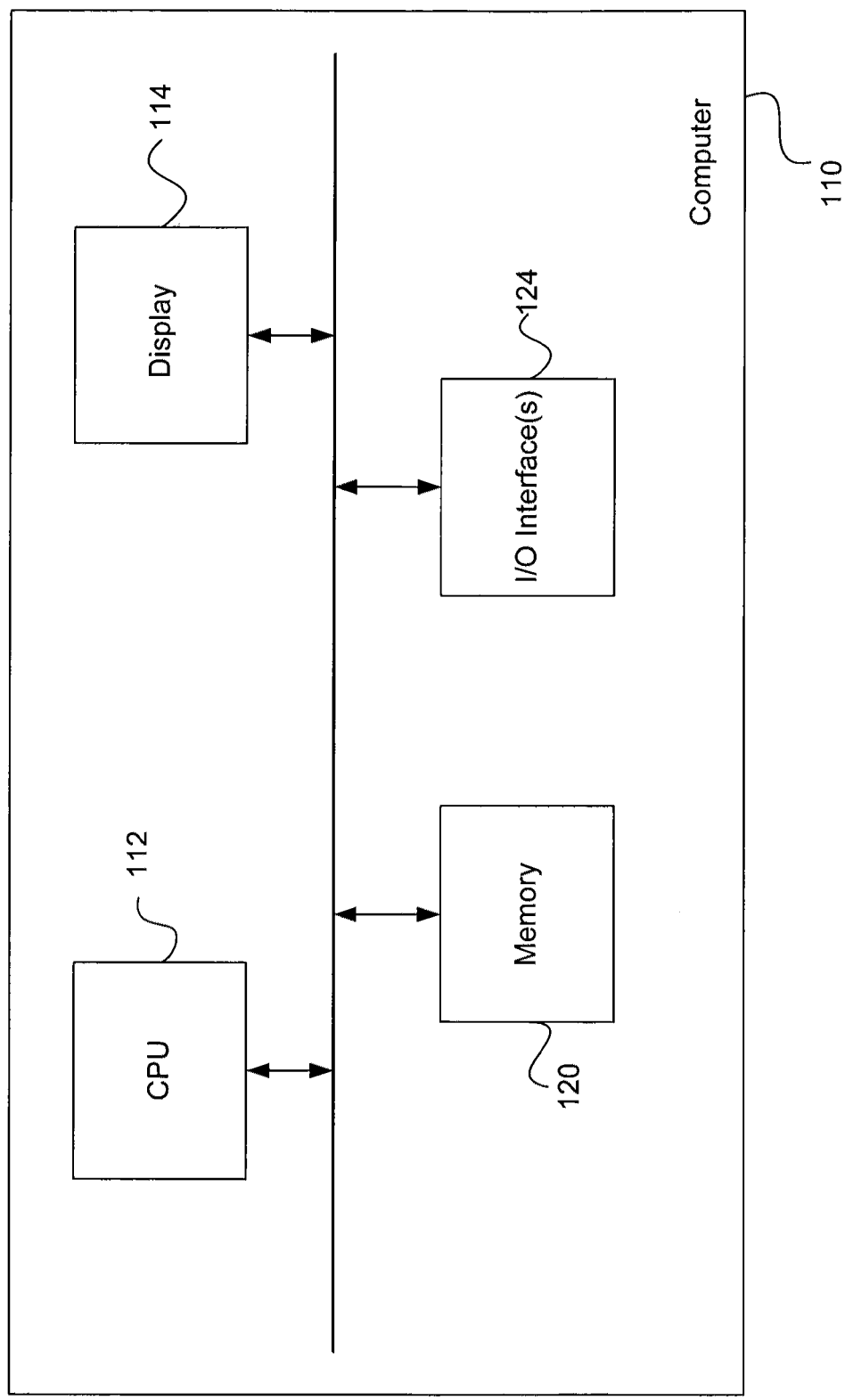
FIG. 1 is a block diagram for one embodiment of a computer, in accordance with the present invention.

Referring now to FIG. 1, a block diagram for one embodiment of a computer 110 is shown, in accordance with the present invention. In the FIG. 1 embodiment, computer 110 may include, but is not limited to, a central processing unit (CPU) 112, a display 114, a memory 120, and one or more input/output interfaces (I/O interfaces) 124. In alternate embodiments, computer 110 may be implemented using various components and configurations in addition to, or instead of, those certain of those components and configurations discussed in conjunction with the FIG. 1 embodiment. In addition, computer 110 may alternately be implemented as any other desired type of electronic device or entity.

In the FIG. 1 embodiment, CPU 112 may be implemented to include any appropriate and compatible microprocessor device that preferably executes software instructions to thereby control and manage the operation of computer 110. The FIG. 1 display 114 may include any effective type of display technology including a cathode-ray-tube monitor or a liquid-crystal display device with an appropriate screen for displaying various information to a device user.

In the FIG. 1 embodiment, memory 120 may be implemented to include any combination of desired storage devices, including, but not limited to, read-only memory (ROM), random-access memory (RAM), and various types of non-volatile memory, such as floppy disks or hard disks. The contents and functionality of memory 120 are further discussed below in conjunction with FIG. 2.

In the FIG. 1 embodiment, I/O interfaces 124 may include one or more input and/or output interfaces to receive and/or transmit any required types of information for computer 110. For example, in the FIG. 1 embodiment, computer 110 may utilize I/O interfaces 124 to communicate with various external entities. In addition, a system user may utilize I/O interfaces 124 to communicate with computer 110 by utilizing any appropriate and effective techniques. The implementation and utilization of the FIG. 1 computer 110 is further discussed below in conjunction with FIGS. 2-7.

Figure 2:
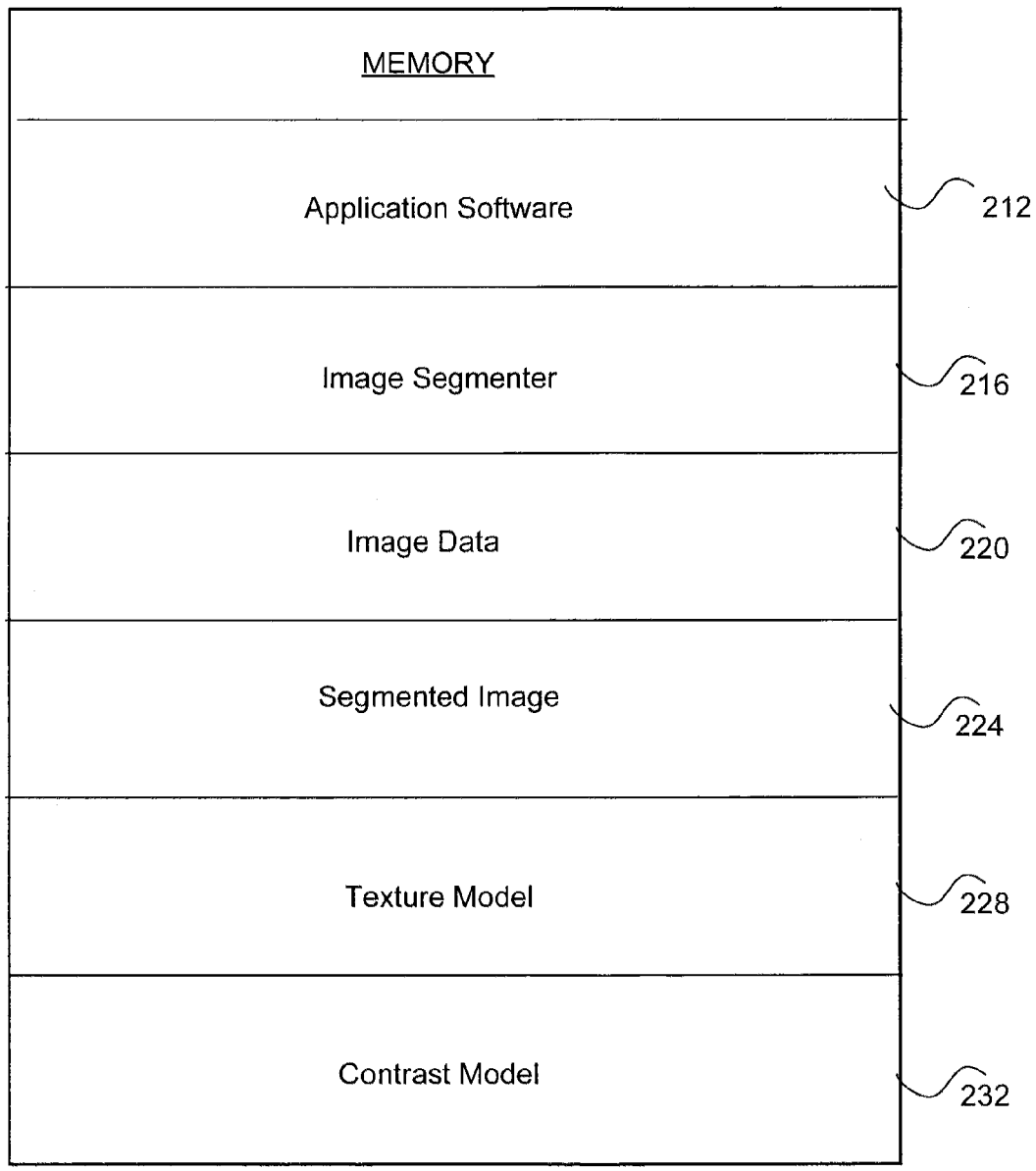
FIG. 2 is a block diagram for one embodiment of the memory of FIG. 1, in accordance with the present invention.

Referring now to FIG. 2, a block diagram for one embodiment of the FIG. 1 memory 120 is shown, in accordance with the present invention. In the FIG. 2 embodiment, memory 120 includes, but is not limited to, application software 212, an image segmenter 216, image data 220, a segmented image 224, a texture model 228, and a contrast model 232. In alternate embodiments, memory 120 may include various other components and functionalities in addition to, or instead of, certain those components and functionalities discussed in conjunction with the FIG. 2 embodiment.

In the FIG. 2 embodiment, application software 212 may include program instructions that are preferably executed by CPU 112 (FIG. 1) to perform various functions and operations for computer 110. The particular nature and functionality of application software 212 preferably varies depending upon factors such as the specific type and particular functionality of the corresponding computer 110.

In the FIG. 2 embodiment, image segmenter 216 may effectively perform various integrated segmentation procedures upon image data 220 in accordance with the present invention to thereby produce a segmented image 224 that partitions image data 220 into individual segments or regions. In the FIG. 2 embodiment, texture model 228 may be created by image segmenter 216 based upon various texture characteristics of image data 220. Similarly, contrast model 232 may be created by image segmenter 216 based upon various contrast characteristics of image data 220. Further details for performing integrated segmentation procedures are discussed below in conjunction with FIGS. 3-7.

In the FIG. 2 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein. The implementation and utilization of image segmenter 216 are further discussed below in conjunction with FIGS. 3 through 7.

Figure 3:
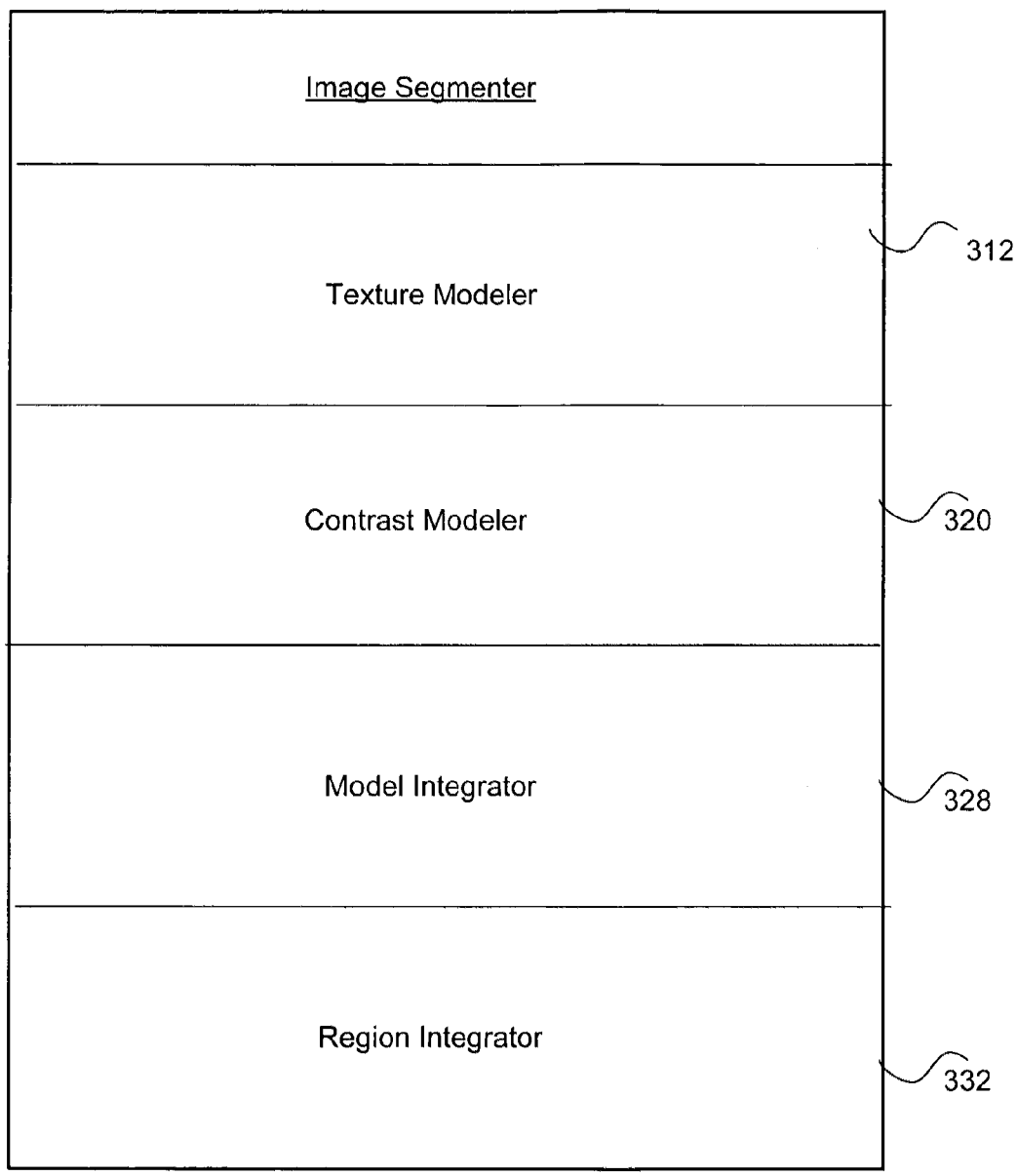
FIG. 3 is a block diagram for one embodiment of the image segmenter of FIG. 2, in accordance with the present invention.

Referring now to FIG. 3, a block diagram for one embodiment of the FIG. 2 image segmenter 216 is shown, in accordance with the present invention. In the FIG. 3 embodiment, image segmenter 216 includes, but is not limited to, a texture modeler 312, a contrast modeler 320, a model integrator 328, and a region integrator 332. In alternate embodiments, image segmenter 216 may include various other components and functionalities in addition to, or instead of, certain those components and functionalities discussed in conjunction with the FIG. 3 embodiment.

In the FIG. 3 embodiment, image segmenter 216 may utilize texture modeler 312 to create a texture model 228 (FIG. 2), as further discussed below in conjunction with FIG. 5. Similarly, image segmenter 216 may utilize contrast modeler 320 to create a contrast model 232 (FIG. 2), as further discussed below in conjunction with FIG. 6. In the FIG. 3 embodiment, image segmenter 216 may then utilize model integrator 328 for combining texture model 228 and contrast model 232 to produce a segmented image 224 (FIG. 2), as discussed below in conjunction with FIG. 4. In the FIG. 3 embodiment, image segmenter 216 may utilize region integrator 332 for performing a region integration procedure, as discussed below in conjunction with FIG. 7. The implementation and utilization of image segmenter 216 are further discussed below in conjunction with FIGS. 4 through 7.

Figure 4:
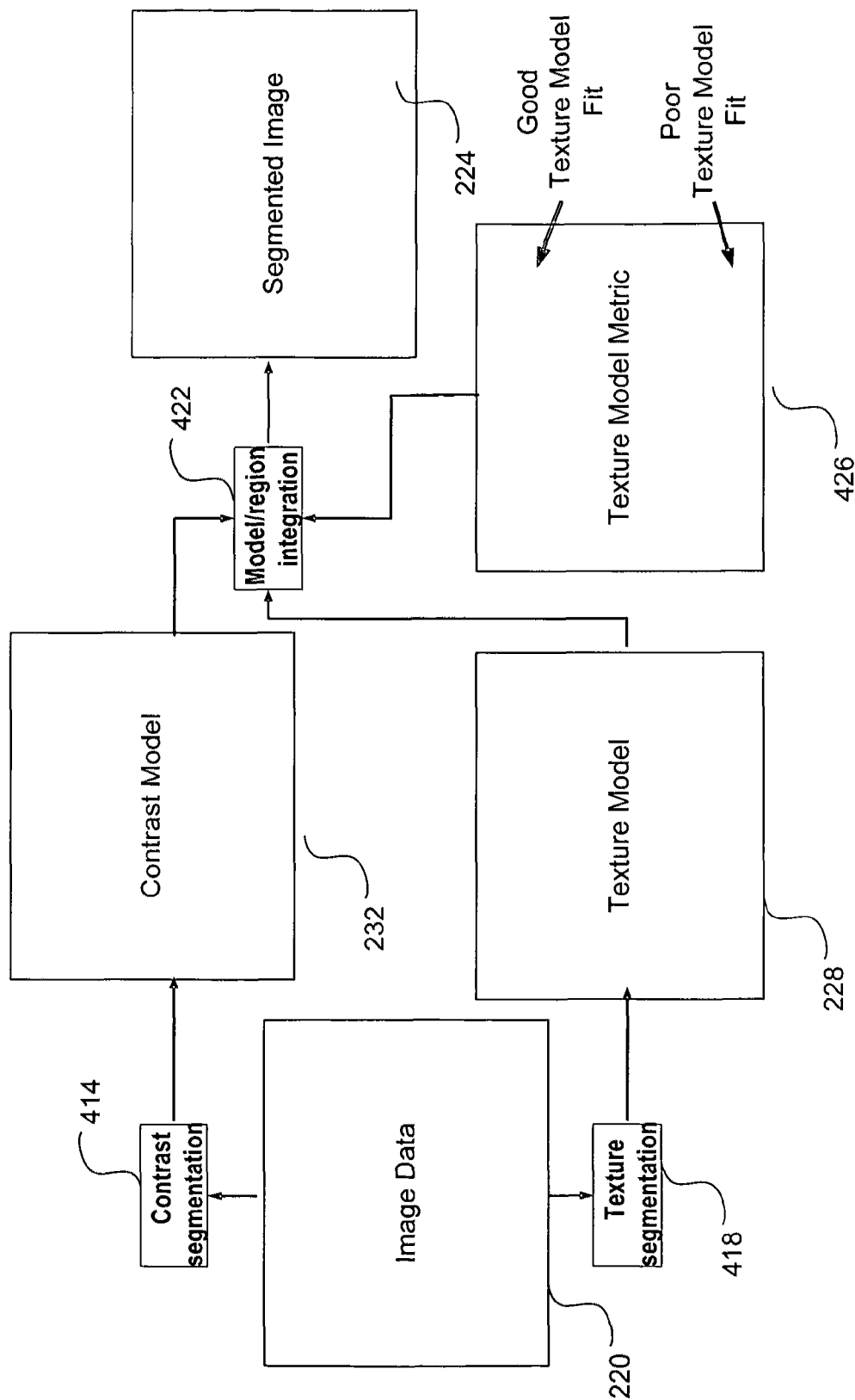
FIG. 4 is a diagram illustrating method steps for performing an integrated segmentation procedure, in accordance with one embodiment of the present invention.

Referring now to FIG. 4, a diagram illustrating method steps for performing an integrated segmentation procedure is shown, in accordance with one embodiment of the present invention. The FIG. 4 example is presented for purposes of illustration, and in alternate embodiments, the present invention may readily utilize various steps and sequences other than those discussed in conjunction with the FIG. 4 embodiment.

In the FIG. 4 embodiment, an image segmenter 216 (FIG. 2) performs an integrated segmentation procedure by utilizing multiple segmented models. In the FIG. 4 embodiment, the segmented models include, but are not limited to, a texture model 228 and a contrast model 232. The image segmenter 216 may then integrate multiple models to produce a final segmented image 224. During the model integration procedure, high textured regions are segmented by utilizing the texture model 228, and more homogeneous regions are segmented by utilizing the contrast model 232. In addition, in certain embodiments, image segmenter 216 may perform a region integration procedure to integrate various individual regions that comply with pre-defined region integration criteria.

In the FIG. 4 embodiment, a texture modeler 312 of the image segmenter 216 performs a texture segmentation procedure 418 to create the texture model 228 based upon original image 220 according to any appropriate techniques to represent different regions with varying degrees of texture characteristics. One technique for creating the texture model 228 is discussed below in conjunction with FIG. 5. In the FIG. 4 embodiment, a contrast modeler 320 of the image segmenter 216 performs a contrast segmentation procedure 414 to create the contrast model 232 based upon original image 220 according to any appropriate techniques to represent different regions with varying degrees of contrast characteristics. One technique for creating the contrast model 232 is discussed below in conjunction with FIG. 6.

In the FIG. 4 embodiment, image segmenter 216 calculates a texture model metric 426 to describe which areas of image 220 have texture characteristics that are greater than a predefined texture threshold level. In the FIG. 4 embodiment, a model integrator 328 of the image segmenter 216 may then perform a model integration procedure 422 to produce the final segmented image 224 by utilizing any appropriate techniques. For example, in certain embodiments, the model integrator 328 utilizes regions from the texture model 228 to segment sections of the image 220 with texture characteristics that are greater than the foregoing pre-defined texture threshold level. Conversely, the model integrator 328 utilizes regions from the contrast model 232 to segment sections of the image 220 with texture characteristics that are less than the foregoing pre-defined texture threshold level.

In certain embodiments, a region integrator 332 of the image segmenter 216 may optionally perform region integration procedures to incorporate various regions that comply with predefined region integration criteria into other segmented regions. Additional techniques and details regarding the region integration procedures are further discussed below in conjunction with FIG. 7. The present invention thus provides a robust image segmentation technique in which an adaptive texture model and a homogeneous contrast model are developed and integrated to address the problem of segmenting images in complicated real world scenarios. Integration of several models provides accurate segmentation for various applications such as image understanding and scene classification.

The present invention is intended to address image segmentation under a wide variety of clutters and in diverse environments. The invention also targets regions suitable for image understanding and scene classification with suitable scale and sizes. Artifacts and imaginary boundaries are minimized to facilitate object recognition and partial scene identification. Until now, image segmentation has conventionally been handled under a single model such as homogeneous in contrast or a good separation of boundary between regions. These methods tend to produce excessive numbers of regions and artifacts. Some heuristics have been applied to alleviate these problems but are not successful in general. Attempts are also made to combine boundary and region model but success is limited.

The present invention therefore provides an improved algorithm for image segmentation using multiple segmentation models. The present invention applies multiple segmentation models in a robust way, and integrates these models according to natural distributions of image contents. The resulting image segmentation is useful in identifying regions in proper scales and sizes to facilitate important applications such as image understanding and scene classification. These novel contributions utilize the natural boundaries in images, and identify which model is more appropriate for a particular region. The end result of this process is a clean segmentation aligned with what human perception would identify. Hence, artifacts are minimized and boundaries are aligned with the natural boundaries between objects in the image. For all of the foregoing reasons, the present invention therefore provides an improved system and method for effectively performing an integrated segmentation procedure.

Figure 5:
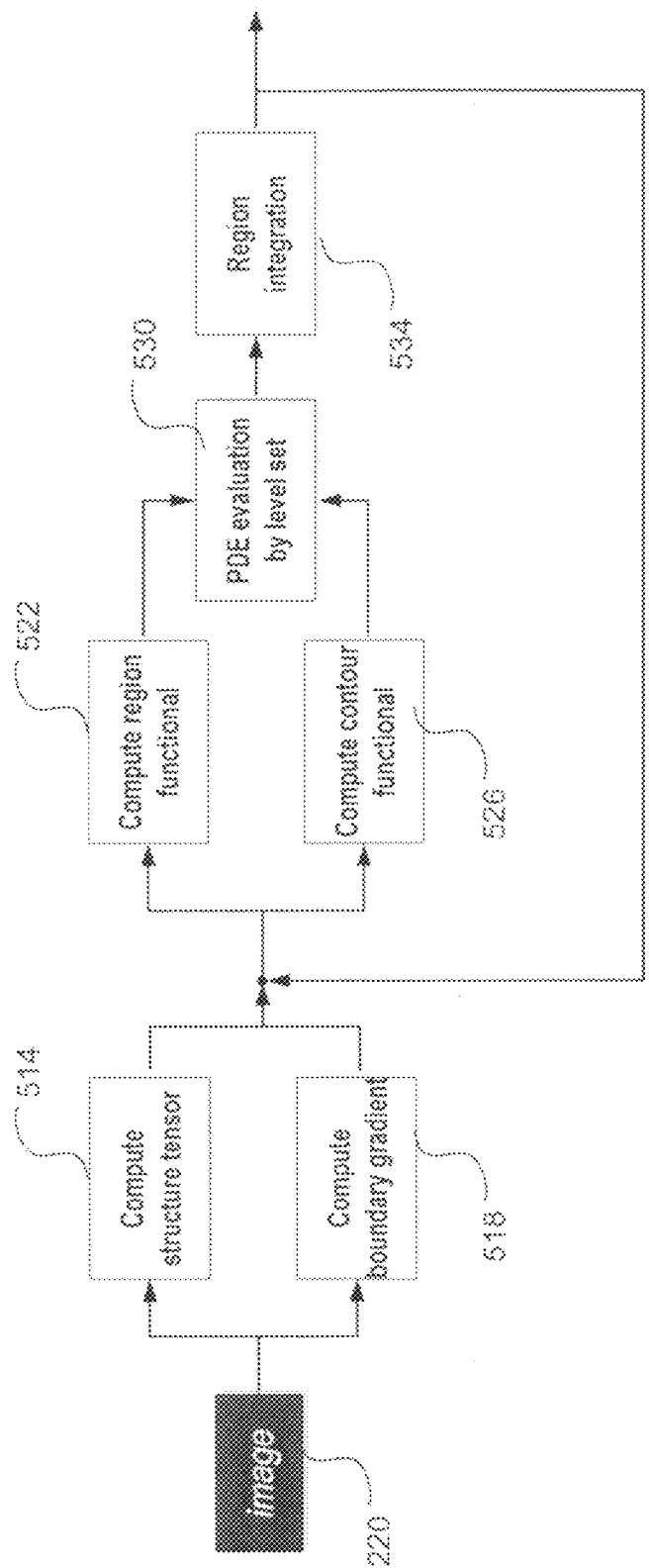
FIG. 5 is a diagram illustrating a texture modeling procedure, in accordance with one embodiment of the present invention.

Referring now to FIG. 5, a diagram illustrating method steps for performing a texture modeling procedure is shown, in accordance with one embodiment of the present invention. The FIG. 5 example is presented for purposes of illustration, and in alternate embodiments, the present invention may readily utilize various steps and sequences other than those discussed in conjunction with the FIG. 5 embodiment.

The present invention may perform texture modeling procedures to create texture models 228 by utilizing any effective techniques. For example, in the FIG. 5 embodiment, a texture modeler 312 (FIG. 3) initially accesses an image 220 for creating a texture model 228. In step 514, texture modeler 312 computes a structure tensor for image 220. The texture modeler 312 may compute a texture model metric and initialize a texture model for probable regions. In addition, in step 518, texture modeler 312 computes a corresponding boundary gradient to find probable boundaries.

Then, in step 522, texture modeler 312 computes a region functional. The texture modeler 312 may compute posterior region model from texture using image structure tensor. In step 526, texture modeler 312 computes a contour functional. The texture modeler 312 may compute a boundary from a level set function and its normal curvature. In step 530, texture modeler 312 then performs a partial differential equation (PDE) evaluation procedure by utilizing appropriate level-set techniques to produce the texture model 228. The texture modeler 312 may utilize a numerical PDE for boundary evolution. In certain embodiments, texture modeler 312 may optionally also perform a region integration procedure in step 534 to reduce the number of regions in texture model 228, as discussed below in conjunction with FIG. 7.

In certain embodiments, texture modeler 312 may thus adopt a level-set computation paradigm for creating texture model 228. In certain embodiments, texture model 228 may be implemented by utilizing a multi-scale image structure tensor that may be expressed with the following formula.

$$T(x) = G_\sigma^* \begin{pmatrix} I_x I_x & I_x I_y \\ I_x I_y & I_y I_y \end{pmatrix},$$

$G_\sigma$: Gaussian, $I$: image, $I_x$, $I_y$: image derivative where $T(x)$ is a texture tensor (a gradient of four I values) for a given pixel multiplied by a Gaussian value to indicate how pixel texture changes in each direction.

In certain embodiments, texture modeler 312 may perform the foregoing PDE evaluation by selecting values that produce a minimum value E in accordance with the following level-set cost function formula.

$$E(\partial \Omega, \Theta) = \sum_{k=1}^{M} \left[ \alpha \int_{\partial \Omega_k} g(\nabla I(\partial \Omega_k(s))) ds + \beta \int \int_{\Omega_k} -\log(p(\theta_k \mid D(x))) dx \right]$$

where M is the number of regions, $\Omega_k$ is a region k, $\delta\Omega$ is the region boundary, represents the boundaries, $\alpha$ (alpha) is a boundary coefficient, x represents the regions, $\beta$ (beta) is a region weighting coefficient, Θ are model parameters $θ_k$, k= 1, ..., M, g(r) is a monotonically decreasing function that indicates that g(r) approaches O as r approaches infinity, and D(x) is derived observation (features) such the texture tensor.

As discussed above in conjunction with FIG. 4, image segmenter 216 may calculate a texture model metric 426 (FIG. 4) to describe which areas of image 220 have texture characteristics that are greater than a predefined texture threshold level. In certain embodiments, a texture model metric ρ (rho) may be derived according to the following formula.

$$\rho(T_1,T_2)=(\Sigma_{i=1}^n(\log(\lambda_i))^2)^{1/2}, \text{ where } (T_1^{-1}T_2)x=\lambda_i x, \lambda_i>0$$

where $(T_1, T_2)$ are tensors for a pair of pixels, and λ (lambda) is an eigen value. The foregoing texture model metric 426 thus quantifies texture characteristics for a given image 220.

Figure 6:
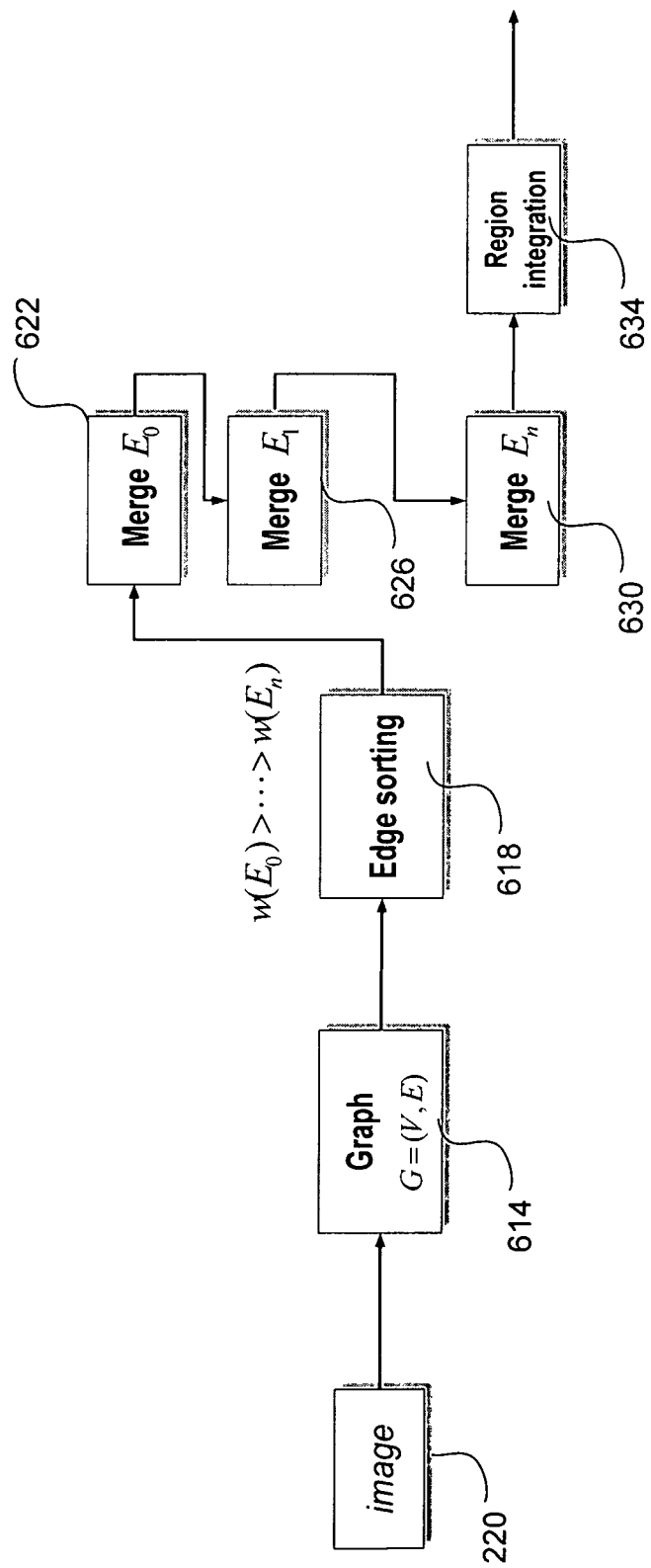
FIG. 6 is a diagram illustrating a contrast modeling procedure, in accordance with one embodiment of the present invention.

Referring now to FIG. 6, a diagram illustrating method steps for performing a contrast modeling procedure is shown, in accordance with one embodiment of the present invention. The FIG. 6 example is presented for purposes of illustration, and in alternate embodiments, the present invention may readily utilize various steps and sequences other than those discussed in conjunction with the FIG. 6 embodiment.

The present invention may perform contrast modeling procedures to create contrast models 232 by utilizing any effective techniques. For example, in the FIG. 6 embodiment, a contrast modeler 320 adopts a graph-based computation paradigm to create a contrast model 232 by utilizing affinity (physical proximity) and color similarity of pixels for a contrast segmentation metric. A graph may be constructed from pixels (vertex) and segmentation metric (edge). Clustering and merging may be performed by traversing the graph. The contrast modeling technique therefore utilizes merging of similar pixels to define pixels with similar contrast characteristics.

In the FIG. 6 example, the contrast modeler 320 (FIG. 3) initially accesses an image 220 for creating a contrast model 232. In step 614, contrast modeler 320 creates a graph with pixels as graph nodes. The graph G may be described with the formula G=(V, E) where V represents vertices and E represents edges. In step 618, contrast modeler 320 performs an edge sorting procedure where "w" is a similarity measurement. Then, in steps 622, 626, through 630, contrast modeler 320 iteratively performs a merging procedure if a similarity threshold level is reached to thereby produce the contrast model 232. In certain embodiments, contrast modeler 320 may optionally also perform a region integration procedure in step 634 to reduce the number of regions in texture model 228, as discussed below in conjunction with FIG. 7.

In certain embodiments, contrast modeler 320 may define a similarity measurement w between two pixels (p, q) by according to the following formula.

$$w(E)=w(p,q)=d((x,y,r,g,b)_p,(x,y,r,g,b)_q))$$

where d is a distance function, x and y are image coordinates, and r, g, b are red, green, and blue color values for the respective pixels.

In accordance with the present invention, once a texture model 228 and a contrast model 232 have been created, then a model integrator 328 may perform a model integration procedure to create a segmented image 224. The texture model 228 is more reliable in regions with consistent spatial variation patterns, but is coarse compared to contrast-based segmentation. The contrast model 232 is finer in region separation, more noisy in textured regions, and less reliable in highly textured regions. The two models are integrated by separating the image 220 into mutual exclusive regions for texture modeling or contrast modeling. The model integrator 328 utilizes the texture metric for defining the region separation, and then integrates the two models depending on modeling characteristics of regions.

Figure 7:
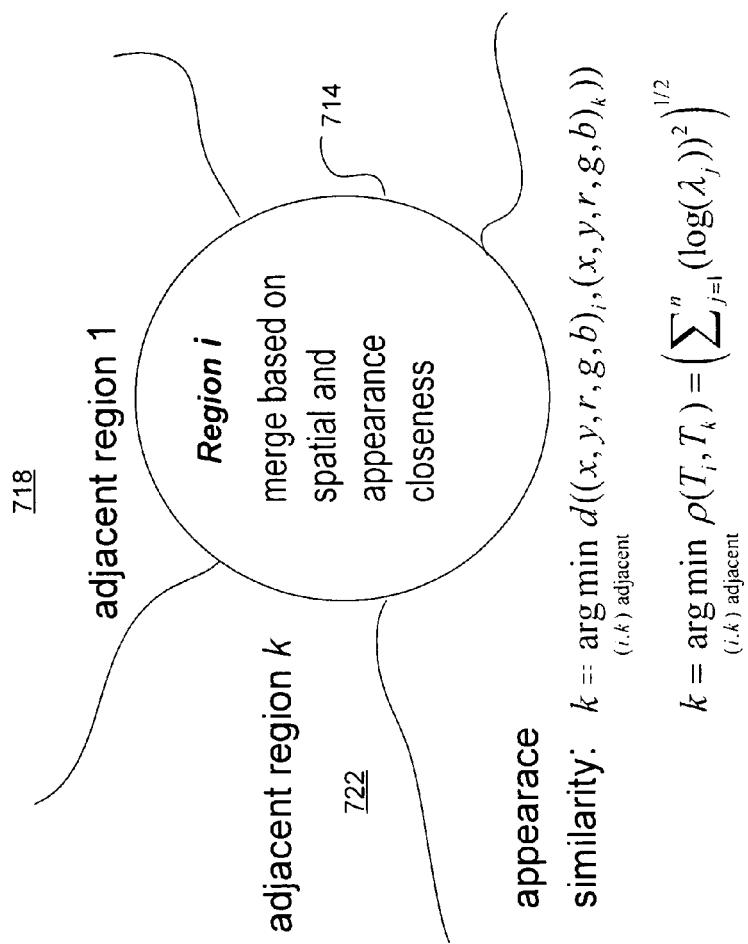
FIG. 7 is a diagram illustrating a region integration procedure, in accordance with one embodiment of the present invention.

Referring now to FIG. 7, a diagram illustrating a region integration procedure is shown, in accordance with one embodiment of the present invention. The FIG. 7 example is presented for purposes of illustration, and in alternate embodiments, the present invention may readily utilize various steps and sequences other than those discussed in conjunction with the FIG. 7 embodiment.

In the FIG. 7 example, a region "i" 714 is shown in the center of a series of adjacent regions 1 (718) through k) 722). A region integrator 332 (FIG. 3) may utilize any effective techniques to integrate or incorporate region i 718 into an adjacent region if certain conditions or criteria are satisfied. Region integration may be desirable for several reasons. Segmentation may result in regions of all sizes. Segmentation may also have various errors or artifacts. In addition, the original regions may be too small to qualify as candidates for sub-scene recognition.

In the FIG. 7 embodiment, regions may be integrated if both regions are similar and spatially adjacent, and if one of these regions is not a candidate for integration. In the FIG. 7 embodiment, a region may be integrated by utilizing spatial and appearance correlation. A region may have adjacent affinity based upon characteristics such as spatial closeness, appearance similarity, and semantics and context (e.g., a tree merged into a forest).

The FIG. 7 embodiment shows two formulas for evaluating region i 714 and adjacent region k 722 for integration. The upper preferred formula in FIG. 7 utilizes contrast characteristics and the lower formula in FIG. 7 alternately utilizes texture characteristics. In the preferred contrast-based formula, "arg min" indicates that region integrator 332 seeks values that produce the minimum value k as a result. In the upper contrast-based formula, d is a distance function between the two regions i and k, x and y are image coordinates for the respective regions, and r, g, b are red, blue, and green color values for pixels in the respective regions.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an integrated segmentation procedure, comprising:
   an image segmenter that performs a model integration procedure to create a final segmented image by combining a plurality of image characteristic models that are derived from an original image, said image characteristic models including a contrast model that represents varying degrees of contrast characteristics in said original image; and
   a processor of an electronic device that controls said image segmenter to perform said integrated segmentation procedure.

2. The system of claim 1 wherein said plurality of image characteristic models include a texture model and said contrast model.

3. The system of claim 1 wherein said final segmented image is utilized for performing an image identification procedure.

4. The system of claim 1 wherein said image segmenter includes a texture modeler, a contrast modeler, and a model integrator.

5. The system of claim 4 wherein said image segmenter includes a region integrator for performing a region integration procedure.

6. The system of claim 4 wherein said texture modeler performs a texture segmentation procedure to create a texture model based upon said original image.

7. The system of claim 6 wherein said contrast modeler performs a contrast segmentation procedure to create said contrast model based upon said original image.

8. The system of claim 4 wherein said image segmenter calculates a texture model metric to describe which areas of said original image have texture characteristics that are greater than a predefined texture threshold level.

9. The system of claim 8 wherein said model integrator performs said model integration procedure to produce said final segmented image by utilizing said texture model to define first regions of said original image with texture characteristics that are greater than said pre-defined texture threshold level.

10. The system of claim 9 wherein said model integrator performs said model integration procedure to produce said final segmented image by utilizing said contrast model to define second regions of said original image with texture characteristics that are less than said pre-defined texture threshold level.

11. The system of claim 10 wherein a region integrator performs a region integration procedure to incorporate qualifying regions that comply with predefined region integration criteria into other segmented regions.

12. The system of claim 6 wherein said texture modeler utilizes a level-set computation paradigm for creating said texture model.

13. The system of claim 7 wherein said contrast modeler utilizes a graph-based computation paradigm to create said contrast model by utilizing physical proximities and color similarities of image pixels for a contrast segmentation metric.

14. The system of claim 2 wherein said texture model and said contrast model are integrated by separating said original image into mutual exclusive regions for texture modeling and contrast modeling.

15. The system of claim 14 wherein a model integrator utilizes a texture metric for defining region separation characteristics, said model integrator then integrating said texture model and said contrast model depending on modeling characteristics of said mutually exclusive regions.

16. The system of claim 1 wherein a region integrator performs a region integration procedure upon said final segmented image when one or more regions of said final segmented image are too small to qualify as candidates for sub-scene recognition.

17. The system of claim 16 wherein said regions qualify to be integrated if said regions are similar and spatially adjacent, and if one of said regions is not a candidate for integration.

18. The system of claim 17 wherein said regions are integrated by utilizing spatial correlation and appearance correlation.

19. The system of claim 18 wherein said regions have adjacent affinity for integrating based upon characteristics such as spatial closeness, appearance similarity, and semantics and context.

20. A method for performing an integrated segmentation procedure, by performing the steps of:
providing an image segmenter for performing a model integration procedure to create a final segmented image by combining a plurality of image characteristic models that are derived from an original image, said image characteristic models including a contrast model that represents varying degrees of contrast characteristics in said original image; and
utilizing a processor of an electronic device for controlling said image segmenter to perform said integrated segmentation procedure.

* * * * *